(12) United States Patent
Ballas et al.

(10) Patent No.: US 8,231,311 B2
(45) Date of Patent: Jul. 31, 2012

(54) CUTTING INSERT

(75) Inventors: Assaf Ballas, Akko (IL); Carol Smilovici, Nahariya (IL)

(73) Assignee: Iscar, Ltd., Tefen (IL)

( * ) Notice: Subject to any disclaimer, the term of this patent is extended or adjusted under 35 U.S.C. 154(b) by 533 days.

(21) Appl. No.: 12/593,254

(22) PCT Filed: Mar. 25, 2008

(86) PCT No.: PCT/IL2008/000410
§ 371 (c)(1),
(2), (4) Date: Sep. 25, 2009

(87) PCT Pub. No.: WO2008/120188
PCT Pub. Date: Oct. 9, 2008

(65) Prior Publication Data
US 2010/0111619 A1 May 6, 2010

(30) Foreign Application Priority Data

Apr. 1, 2007 (IL) .......................................... 182343

(51) Int. Cl.
*B23C 5/20* (2006.01)
*B23B 27/16* (2006.01)
(52) U.S. Cl. ........................................ 407/113; 407/114
(58) Field of Classification Search .................. 407/113, 407/114, 115, 116, 66, 67
See application file for complete search history.

(56) References Cited

U.S. PATENT DOCUMENTS

| | | | |
|---|---|---|---|
| 4,971,483 A | 11/1990 | Kress et al. | |
| 5,382,118 A | 1/1995 | Satran et al. | |
| 5,807,031 A * | 9/1998 | Arai et al. | 407/113 |
| 5,904,450 A * | 5/1999 | Satran et al. | 407/113 |
| 6,196,771 B1 | 3/2001 | Anderson | |
| 6,254,316 B1 * | 7/2001 | Strand | 407/113 |
| 8,113,746 B2 * | 2/2012 | Koga | 407/113 |
| 2006/0210364 A1 | 9/2006 | Bellmann et al. | |
| 2007/0003384 A1 | 1/2007 | Smilovici et al. | |
| 2007/0059110 A1 * | 3/2007 | Choi et al. | 407/113 |
| 2011/0170963 A1 * | 7/2011 | Smilovici et al. | 407/42 |

FOREIGN PATENT DOCUMENTS

EP 1 181 999 2/2002

OTHER PUBLICATIONS

International Search Report in PCT/IL2008/000410, dated Sep. 18, 2008.
Written Opinion in PCT/IL2008/000410, dated Sep. 18, 2008.
Chinese Office Action in application No. 200880011363.8, dated Aug. 27, 2010.

* cited by examiner

*Primary Examiner* — Will Fridie, Jr.
(74) *Attorney, Agent, or Firm* — Womble Carlyle

(57) ABSTRACT

A cutting insert having a pentagonal prismatic shape. A cutting region is associated with each polygonal side and is elevated with respect to a central tangential abutment surface. A primary cutting edge associated with a polygonal side is formed at the intersection of a primary rake surface and a primary relief surface. A secondary cutting edge associated with a rounded corner is formed at the intersection of a secondary rake surface and a secondary relief surface and merges with the primary cutting edge. The primary relief surface forms with the associated side abutment surface a primary relief surface angle that varies from a maximal value adjacent an upper end of the primary cutting edge to a minimal value. The secondary relief surface forms with the associated rounded corner a secondary relief surface angle that varies from a maximal value adjacent the primary cutting edge to a minimal value.

17 Claims, 9 Drawing Sheets

CUTTING INSERT

FIELD OF THE INVENTION

The present invention relates to cutting inserts for high speed milling combined with ramp down operations.

BACKGROUND OF THE INVENTION

A milling technique known as high feed milling or HFM is characterized by a low engagement into a workpiece, in axial direction relative to a tool axis, and a high feed rate. The high speed milling machining method is widespread in industry. There are many cutting geometries which allow realizing this technique. Some geometries can be observed on solid tools and replaceable solid heads and others have been realized with different cutters having indexable cutting inserts mounted therein.

Ramping or ramp down milling is known as a milling process with a lateral feed combining an axial feed. Due to the ability to achieve high metal removal rate in rough milling with relatively light machine tools the mentioned technique is very popular in the die and mold industry. Machining cavities and pockets is a typical application in this field, therefore, the tool ramping capabilities have significant meaning. Another important factor for the die and mold industry, namely, machining with a large tool overhang, which decreases static and dynamic stiffness of the clamped tool and affects cutting stability, requires reliable insert clamping in order to prevent premature insert wear and even its breakage.

There are two main design approaches to cutting edges of the tools for high feed milling, particularly for ramping. According to one approach the cutting edge is a portion of a cutter with round inserts of large diameter. According to another approach the cutting edge is a straight line inclined at a small angle. A high feed milling insert is clamped by a clamping screw that passes through the central hole of the insert, but in many cases an additional clamping element, like a clamping arm, is introduced in the tool design in order to reliably fix the insert into the pocket.

An example of a tool for high feed milling is described in U.S. Pat. No. 6,413,023 being directed to a product named HITACHI ASR Alpha Turbo line. The insert has a main cutting edge portion, a peripheral cutting edge portion and an internal straight cutting edge portion. The insert has a positive side inclination, that is, the side surfaces are forming with the upper surface an angle that is less than 90°. The patent figures show that the insert can have two or three cutting edges. The tool comprises two clamping elements. A first clamping element is the insert clamping screw. The second clamping element is the clamping arm.

A similar approach to insert clamping is observed in DIJET High Feed Diemaster "SKS" Type, MITSUBISHI High-feed radius milling cutter AJX type (Japanese patent applications JP20040268123 20040915, JP20040259472 20040907), KORLOY HRM Tools. The inserts have three cutting edges and side inclination between 13° to 15° that ensures necessary relief for inserts mounted on a tool. As a result of the positive side inclination one of the components of the pocket wall reaction force tends to push the insert off from the pocket bottom.

The clamping arm, an important element for rigid clamping and, hence, stable cutting, comprises a number of parts, and thus can cause a certain amount of inconvenience for an operator due to the necessity to use two different wrenches for insert indexing or replacing, namely, one for the clamping screw and the other for the clamping arm. Another disadvantage of using a clamping arm is the increased time necessary for the tool production, since there are more machining and assembling operations.

Furthermore, the clamping arm is an obstacle for free chip flow and experiences additional loading because of chip strikes, especially in pockets machining, when chip evacuation is difficult.

Therefore, some known solutions for HFM inserts with positive side inclination use a clamping screw only. For example, FETTE MultiEdge 3Feed, ISCAR FeedMill (U.S. Pat. No. 6,709,205) or SAFETY PENTA High Feed. FETTE (MultiEdge 3Feed) decreases the side inclination angle to 11°. ISCAR (FeedMill) adds a cylindrical protrusion to the insert bottom and a recess to the pocket base wall accordingly. The protrusion makes the location and clamping of the insert more reliable by the additional abutment surface but limits the number of indexable cutting edges since the cutting insert can not be reversible. All the indexable milling inserts considered above are one-sided.

U.S. Pat. No. 3,289,271 discloses a replaceable indexable cutting insert that is used for turning applications. The cutting insert is provided with a plurality of sides between two parallel faces such that each side has an angle less than 90° with another face. In FIG. 1 of '271 there is shown a cutting insert (10) with a generally trigonal shape, wherein the cutting insert utilizes on a given face (12) three cutting edges (40, 44, 48) that their sides (16, 20, 24) have less than 90° with the face (12).

Since the cutting insert (10) has three cutting edges per face, and since it is capable of being turned over to the other face, the cutting insert is provided with a total of six cutting edges. The cutting insert (10) is limited from being used for high speed machining since it is not provided with adequate means for disposing of chips, especially, for external milling together with ramp down milling.

In known cutting inserts for high milling, the chips produced are curled toward the cutting tool axis. This requires to considerably increasing the flute for the chips, a fact that consequently weakens the tool body.

It is the object of the present invention to provide a cutting insert that significantly reduces or overcomes the aforementioned disadvantages.

It is a further object of the present invention to provide a cutting insert that is particularly useful for high speed milling combined with ramp down operations.

It is still a further object of the present invention to provide a cutting insert that is particularly useful for high speed milling combined with ramp down operations that has an increased number of cutting edges.

It is yet a further object of the present invention to provide a tool body for clamping such a cutting insert.

SUMMARY OF THE INVENTION

In accordance with the present invention there is provided a cutting insert having a polygonal prismatic shape with two opposing end surfaces and a peripheral surface extending therebetween, a median plane is located between the end surfaces bisecting the cutting insert, the peripheral surface has a plurality of polygonal sides, each polygonal side has a side abutment surface and merges with an adjacent polygonal side through a rounded corner, each rounded corner forms a vertex of the polygonal shape, the cutting insert comprising:
  a through bore, having a through bore axis, extending between the end surfaces;
  an insert tangential abutment surface extending around the through bore;

a cutting region associated with each of the polygonal sides, the cutting region being elevated with respect to the insert tangential abutment surface and comprising:
a primary cutting edge, associated with a polygonal side, formed at an intersection of a primary rake surface and a primary relief surface;
a secondary cutting edge, associated with a rounded corner, formed at an intersection of a secondary rake surface and a secondary relief surface, and merging with the primary cutting edge; wherein
the primary cutting edge comprises three primary cutting edge portions as seen in a side view of the cutting insert:
a substantially straight first primary central portion that is slanted with respect to the median;
a convex second primary portion that merges with the first primary central portion at an upper end of the first primary central portion;
a concave third primary portion that merges with the first primary central portion at a lower end of the first primary central portion;
the secondary cutting edge comprises three secondary cutting edge portions as seen in a side view of the cutting insert:
a substantially straight first secondary central portion that is slanted with respect to the median plane, the first primary and secondary central portions slanting in different directions;
a convex second secondary portion that merges with the first secondary central portion at an upper end of the first secondary central portion;
a concave third secondary portion that merges with the first secondary central portion at a lower end of the first secondary central portion;
the primary relief surface forms a primary relief surface angle with an associated side abutment surface, the primary relief surface angle varies from a primary first maximal value adjacent a primary edge upper end to a primary second minimal value adjacent a primary edge lower end; and
the secondary relief surface forms a secondary relief surface angle with an associated rounded corner, the secondary relief surface angle varies from a secondary first maximal value adjacent a secondary edge upper end to a secondary second minimal value adjacent a secondary edge lower end.

According to a specific embodiment of the present invention, the primary first maximal value is 10°, the primary second minimal value is 0°, the secondary first maximal value is 10°, and the secondary second minimal value is 0°.

Advantageously, the polygonal shape is a regular polygon.

If desired, the regular polygon is a regular pentagon.

Typically, the two end surfaces are identical.

Further typically, the cutting insert has 180° rotational symmetry with respect to a symmetry axis that extends between a vertex and a through bore axis, and lies in the median plane.

According to a first embodiment of the present invention, the primary relief surface and the secondary relief surface form straight lines in side cross-sectional views of the cutting insert.

According to a second embodiment of the present invention, the primary relief surface and the secondary relief surface form curved lines in side cross-sectional views of the cutting insert.

Further in accordance with the present invention there is provided a cutting tool having a longitudinal axis of rotation and comprising:
a tool body having at least one insert pocket formed in a front end of the tool body and a cutting insert retained in the at least one insert pocket, the at least one insert pocket comprising:
a pocket tangential abutment surface;
a threaded bore extending tangentially rearwardly from the pocket tangential abutment surface;
pocket side walls extending upwardly from the pocket tangential abutment surface, two of the pocket side walls are a first pocket abutment surface and a second pocket abutment surface, each of which forms a pocket internal angle with the pocket tangential abutment surface;
the cutting insert has a polygonal prismatic shape with two opposing end surfaces and a peripheral surface extending therebetween, a median plane is located between the end surfaces bisecting the cutting insert, the peripheral surface has a plurality of polygonal sides, each polygonal side has a side abutment surface and merges with an adjacent polygonal side through a rounded corner, each rounded corner forms a vertex of the polygonal shape, the cutting insert comprising:
a through bore extending between the end surfaces;
an insert tangential abutment surface extending around the through bore;
a cutting region associated with each of the polygonal sides, the cutting region being elevated with respect to the insert tangential abutment surface and comprising:
a primary cutting edge, associated with a polygonal side, formed at an intersection of a primary rake surface and a primary relief surface;
a secondary cutting edge, associated with a rounded corner, formed at an intersection of a secondary rake surface and a secondary relief surface, and merging with the primary cutting edge;
the primary cutting edge comprises three primary cutting edge portions as seen in a side view of the cutting insert:
a substantially straight first primary central portion that is slanted with respect to the median plane;
a convex second primary portion that merges with the first primary central portion at an upper end of the first primary central portion;
a concave third primary portion that merges with the first primary central portion at a lower end of the first primary central portion;
the secondary cutting edge comprises three secondary cutting edge portions as seen in a side view of the cutting insert:
a substantially straight first secondary central portion that is slanted with respect to the median plane, the first primary and secondary central portions slanting in different directions;
a convex second secondary portion that merges with the first secondary central portion at an upper end of the first secondary central portion;
a concave third secondary portion that merges with the first secondary central portion at a lower end of the first secondary central portion;
the primary relief surface forms a primary relief surface angle with an associated side abutment surface, the primary relief surface angle varies from a primary first maximal value adjacent a primary edge upper end to a primary second minimal value adjacent a primary edge lower end;

the secondary relief surface forms a secondary relief surface angle with an associated rounded corner, the secondary relief surface angle varies from a secondary first maximal value adjacent a secondary edge upper end to a secondary second minimal value adjacent a secondary edge lower end; wherein the insert tangential abutment surface abuts the pocket tangential abutment surface, a first side abutment surface of the cutting insert abuts the first pocket abutment surface, a second side abutment surface of the cutting insert abuts the second pocket abutment surface, and a clamping bolt passes through the through bore of the cutting insert and threadingly engages the threaded bore.

Generally, the first pocket abutment surface and the second pocket abutment surface are separated by a pocket side wall that is not a pocket abutment surface and the side abutment surface of the cutting insert that is located between the two abutted side abutment surfaces remains unabutted.

If desired, the pocket tangential abutment surface is separated from the pocket side walls by a clearance groove.

Further is desired, a forward end of the pocket tangential abutment surface is provided with chamfered clearance surfaces.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
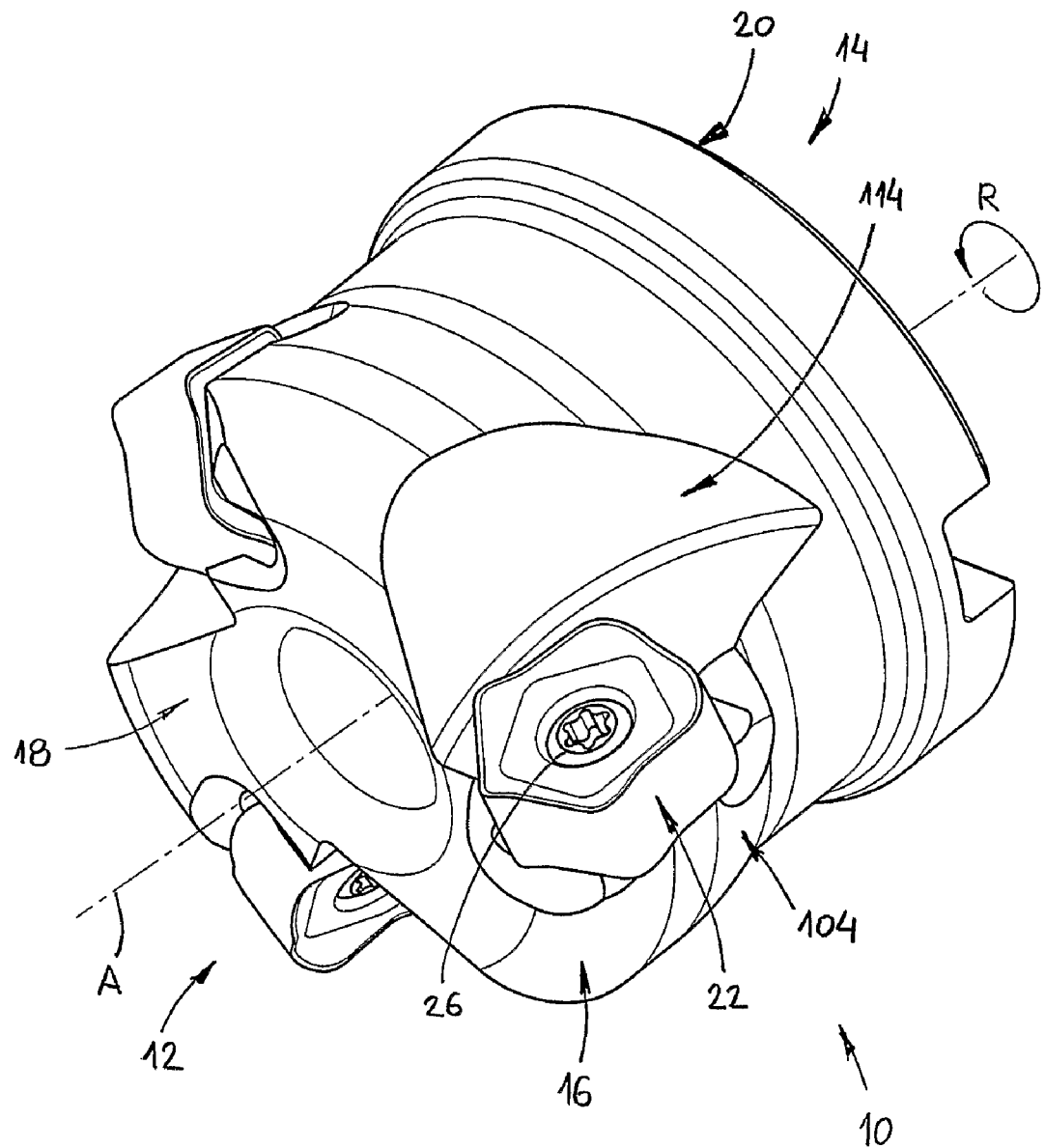
FIG. 1 is a perspective view of a cutting tool in accordance with the present invention.
Figure 2:
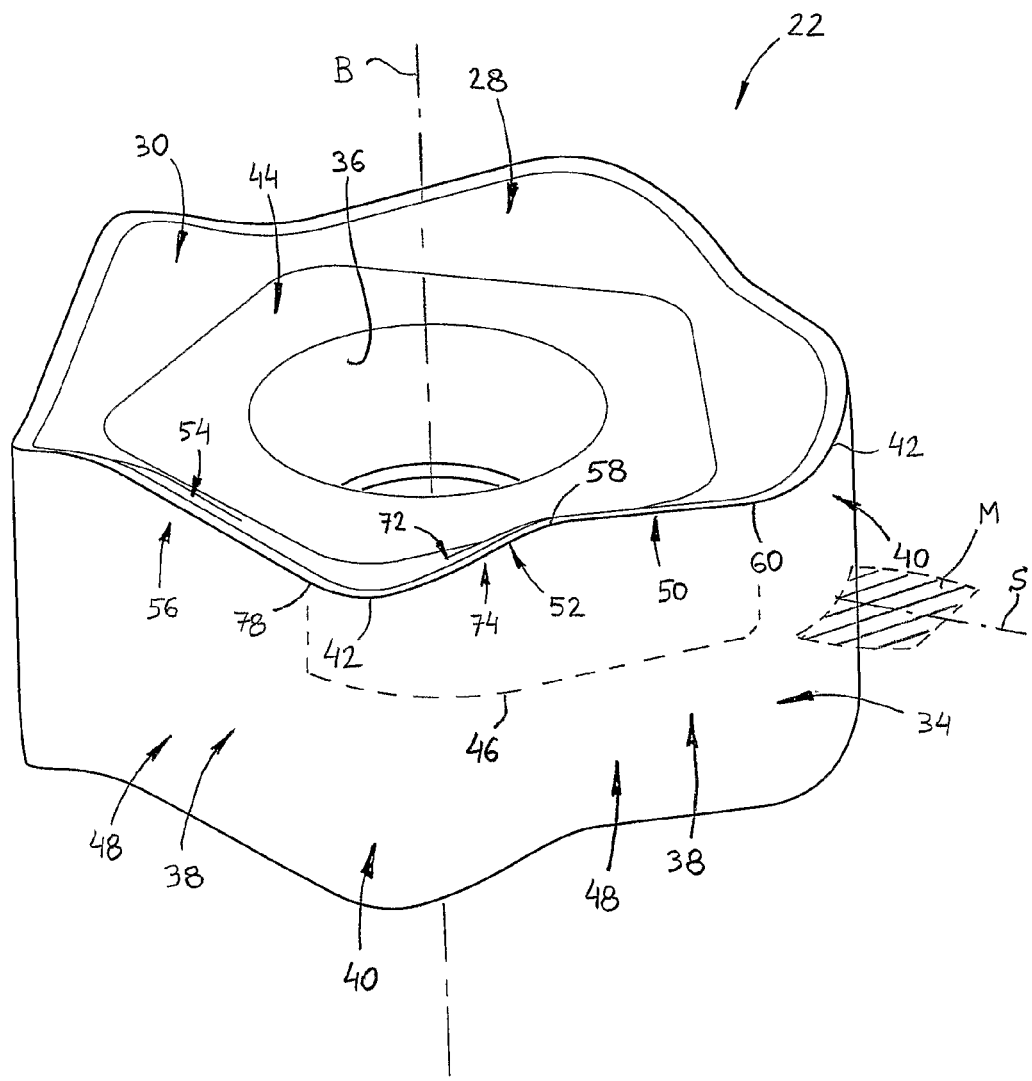
FIG. 2 is a perspective view of a cutting insert in accordance with the present invention.

Attention is first drawn to FIG. 1 showing a cutting tool 10 in accordance with the present invention. The cutting tool 10 has a longitudinal axis of rotation A defining a front end 12, a rear end 14, and a direction of rotation R. The cutting tool 10 comprises a tool body 16 having a front end 18 and a rear end 20. The tool body 16 has a plurality of cutting inserts 22 mounted therein. Each of the cutting inserts 22 is seated within an insert pocket 24 and retained by a clamping bolt 26.

Attention is now drawn to FIGS. 2 to 8. The cutting insert 18 has a generally pentagonal shape and comprises two opposing end surfaces 28, namely, an upper surface 30 and a lower surface 32. A peripheral surface 34 extends between the two end surfaces 28. A through bore 36 having a through bore axis B extends between the two end surfaces 28. A median plane M is located between the end surfaces 28 bisecting the cutting insert 22. Since the two end surfaces 28 are identical, only one of them will be described.

Each side of the pentagonal shape forms a side abutment surface 38 that is located on the peripheral surface 34. Each side abutment surface 38 merges with an adjacent side abutment surface 38 through a rounded corner 40. Each rounded corner 40 forms a vertex 42 of the pentagon when the cutting insert 22 is viewed in an end view, also referred to herein as a top view. The cutting insert 22 has 180° rotational symmetry with respect to a symmetry axis S that extends between a vertex 42 and the through bore axis B, and lies in the median plane M.

An insert tangential abutment surface 44 extends around the through bore 36 at each end surface 28. A cutting region 46 is associated with each of the sides 48 of the pentagon. The cutting region 46 is elevated from the insert tangential abutment surface 44, with respect to the median plane M, as seen in a side cross-sectional view of the cutting insert 22.

The cutting region 46 comprises a primary cutting edge 50 and a secondary cutting edge 52 that merge together. The primary cutting edge 50 is associated with a side 48 of the pentagon and the secondary cutting edge 52 is associated with a rounded corner 40.

The primary cutting edge 50 is formed at the intersection of a primary rake surface 54 and a primary relief surface 56. The primary cutting edge 50 has a primary edge upper end 58 that merges with the secondary cutting edge 52, and, a primary edge lower end 60 distal from the primary edge upper end 58 that merges with the secondary cutting edge 52 of the succeeding cutting region 46. The primary cutting edge 50 comprises three primary cutting edge portions that can be clearly seen in a side view of the cutting insert 22.

A first primary cutting edge portion is a substantially straight first primary central portion 62 that is slanted with respect to the median plane M. A second primary cutting edge portion is a convex second primary portion 64 that merges with the first primary central portion 62 at an upper end 66 of the first primary central portion 62. A third primary cutting edge portion is a concave third primary portion 68 that merges with the first primary central portion 62 at a lower end 70 of the first primary central portion 62.

Figure 3:
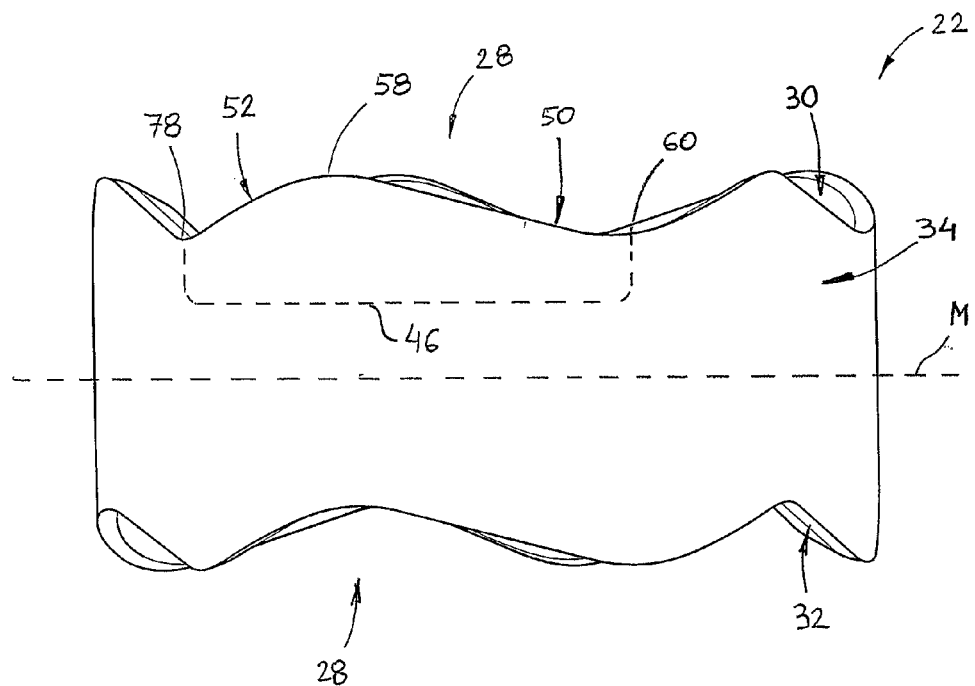
FIG. 3 is a side view of the cutting insert of FIG. 2.
Figure 4:
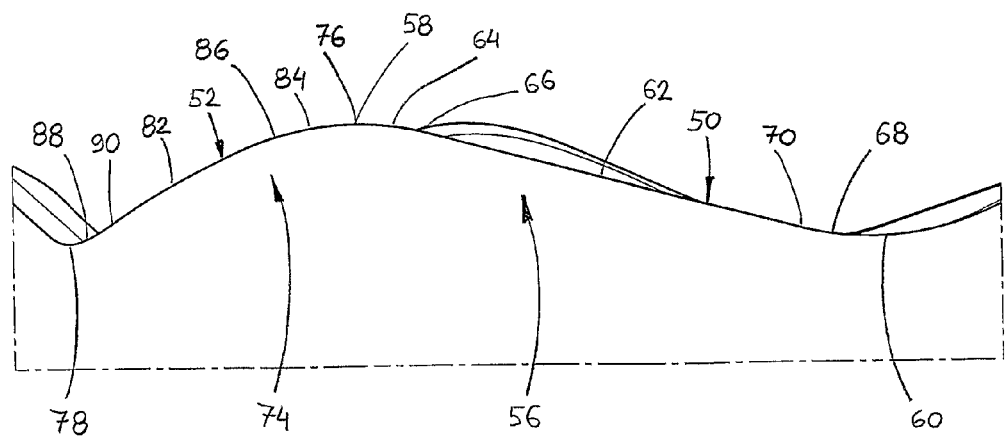
FIG. 4 is an enlarged view of a cutting region shown in FIG. 3.
Figure 5:
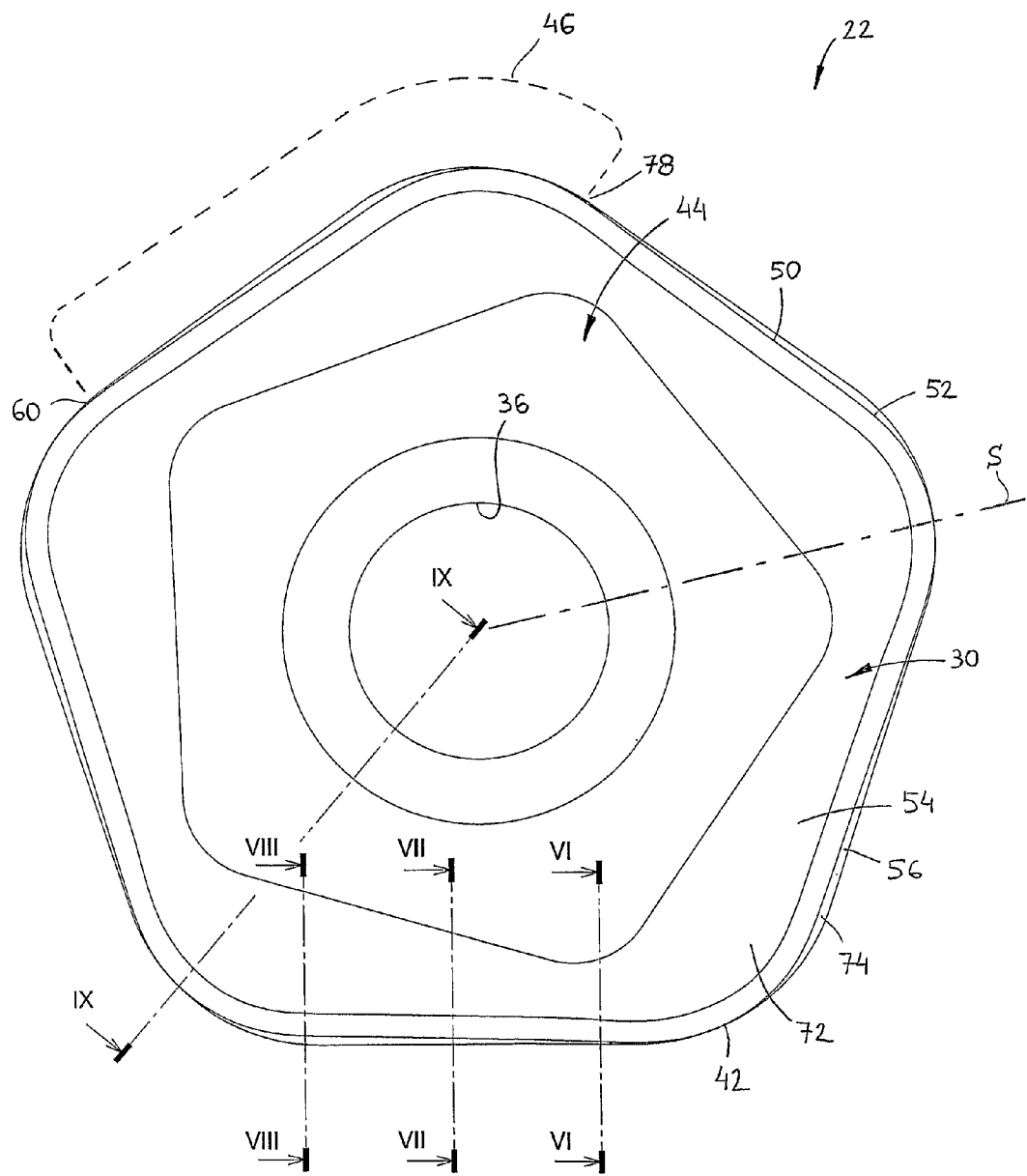
FIG. 5 is a top view of the cutting insert of FIG. 2.

The secondary cutting edge 52 is formed at the intersection of a secondary rake surface 72 and a secondary relief surface 74. The secondary cutting edge 52 has a secondary edge upper end 76 that merges with the primary edge upper end 58 of the primary cutting edge 50, and, a secondary edge lower end 78 distal from the secondary edge upper end 76 that merges with the primary edge lower end 60 of the primary cutting edge 50 of the preceding cutting region 46. As best seen in FIGS. 3-5, the secondary edge lower end 78 and the primary edge lower end 60 are spaced apart from their associated vertex 42. The secondary cutting edge 52 comprises three secondary cutting edge portions that can be clearly seen in a side view of the cutting insert 22.

A first secondary cutting edge portion is a substantially straight first secondary central portion 82 that is slanted with respect to the median plane M. The first primary and secondary cutting edge portions slant in different directions. A second secondary cutting edge portion is a convex second secondary portion 84 that merges with the first secondary central portion 82 at an upper end 86 of the first secondary central portion 82. A third secondary cutting edge portion is a concave third secondary portion 88 that merges with the first secondary central portion 82 at a lower end 90 of the first secondary central portion 82.

Figure 6:
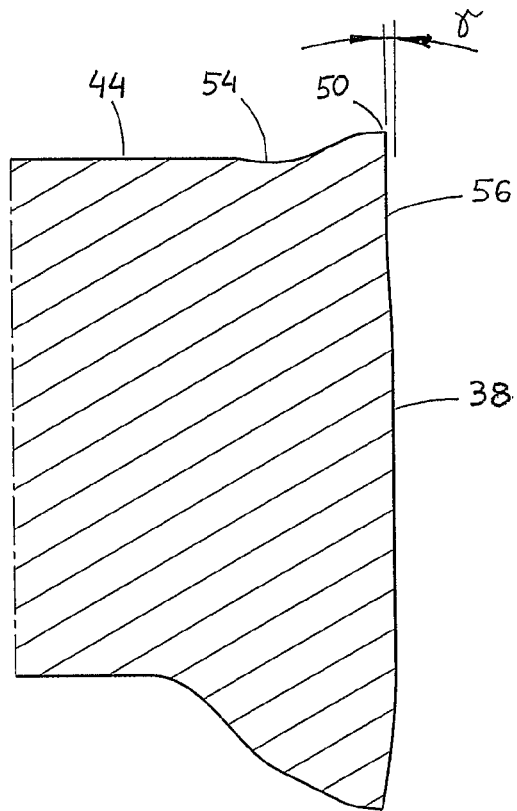
FIG. 6 is a cross-sectional view of the cutting insert taken along line VI-VI in FIG. 5.
Figure 7:
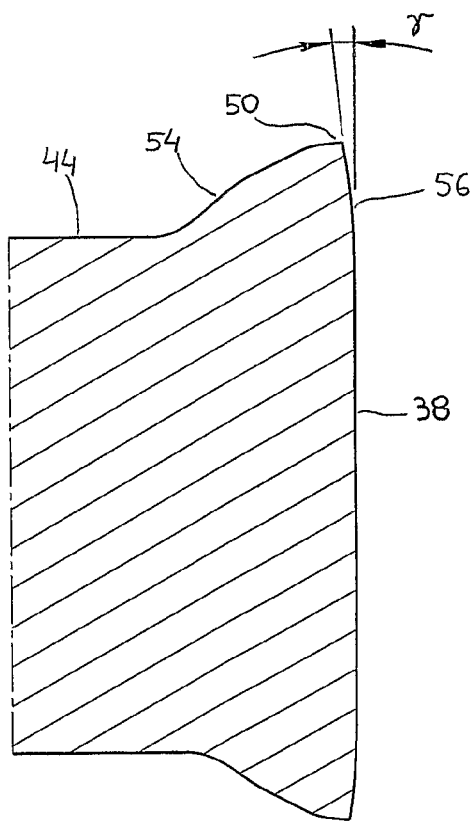
FIG. 7 is a cross-sectional view of the cutting insert taken along line VII-VII in FIG. 5.
Figure 8:
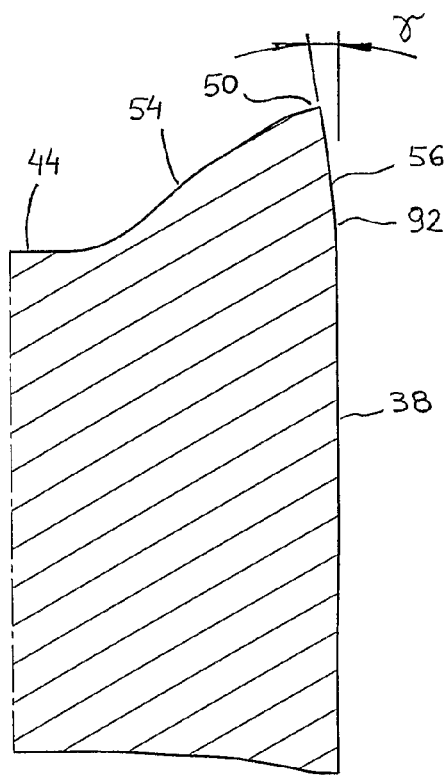
FIG. 8 is a cross-sectional view of the cutting insert taken along line VIII-VIII in FIG. 5.

As seen in FIGS. 6 to 8, the primary relief surface 56 forms a primary relief surface angle γ with the associated side abutment surface 38. The primary relief surface angle γ varies from a primary first maximal value adjacent the primary edge upper end 58 (see FIG. 8) to a primary second minimal value adjacent the primary edge lower end 60 (see FIG. 6). According to a specific embodiment of the present invention, the primary first maximal value is 10° and the primary second minimal value is 0°. As shown in FIGS. 6 to 8, the primary relief surface 56 forms a part of a straight line in each side cross-sectional view of the cutting insert 22, however, it is understood that the primary relief surface 56 as an entirety is curved.

Figure 9:
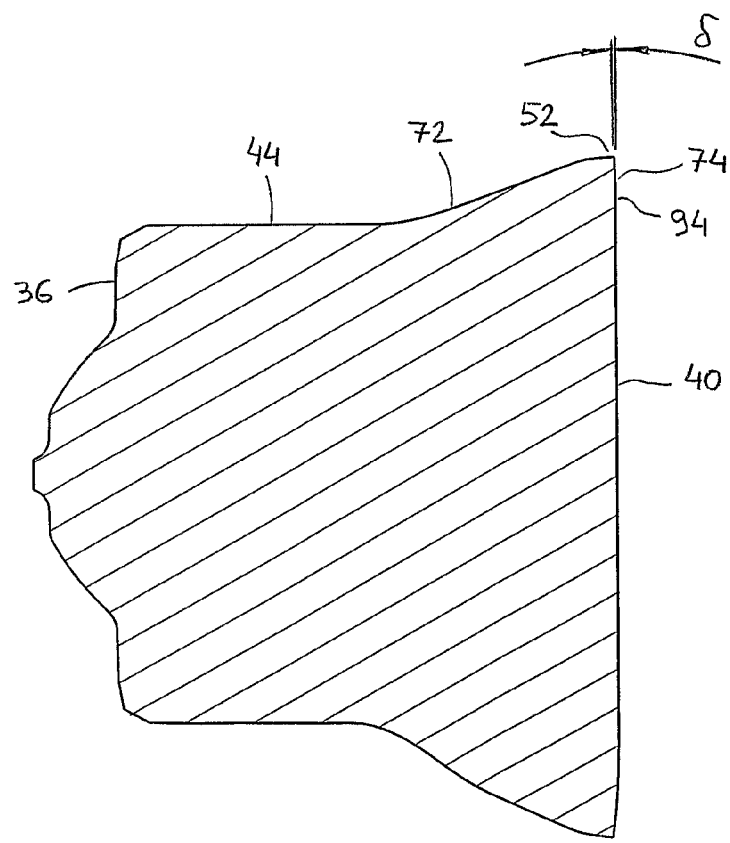
FIG. 9 is a cross-sectional view of the cutting insert taken along line IX-IX in FIG. 5.

As seen in FIG. 9, the secondary relief surface 74 forms a secondary relief surface angle δ with the associated rounded corner 40. The secondary relief surface angle δ varies from a secondary first maximal value adjacent the secondary edge upper end 76 to a secondary second minimal value adjacent the secondary edge lower end 78. According to a specific embodiment of the present invention, the secondary first maximal value is 10° and the secondary second minimal value is 0°. As shown in FIG. 9, the secondary relief surface 74 forms a part of a straight line in each side cross-sectional view of the cutting insert 22 (only one cross-sectional view of the secondary relief surface 74 is shown), however, it is understood that since the secondary relief surface angle δ varies along the length of the secondary relief surface 74, the secondary relief surface 74 advantageously lies on a surface that is not cylindrical, as may be the rounded corner 40, but, differently curved.

The primary relief surface angle γ has a primary relief surface angle vertex 92 formed between the primary relief surface 56 and the side abutment surface 38 (see FIG. 8). According to a first embodiment of the present invention, the primary relief surface angle vertex 92 is found substantially at a level similar to the level of the insert tangential abutment surface 44 as seen in a side cross-sectional view of the cutting insert 22. However, according to other embodiments of the present invention, the primary relief surface angle vertex 92 may be found at a level different from the level of the insert tangential abutment surface 44. In that sense, the primary relief surface angle vertex 92 may be found at a level that is higher or lower than the level of the insert tangential abutment surface 44.

The primary relief surface 56 does not have to be a straight line as seen in a side cross-sectional view of the cutting insert 22. Rather, the primary relief surface 56 may be a curved line in a side cross-sectional view of the cutting insert. The primary relief surface 56 is curved. If desired, the primary relief surface 56 may be continuously curved along the length of the primary cutting edge 50. Optionally, according to another embodiment of the cutting insert 22, the primary relief surface 56 may be planar.

The secondary relief surface angle δ has a secondary relief surface angle vertex 94 formed between the secondary relief surface 74 and the rounded corner 40 (see FIG. 9). According to a second embodiment of the present invention, the secondary relief surface angle vertex 94 is found substantially at a level similar to the level of the insert tangential abutment surface 44 as seen in a side cross-sectional view of the cutting insert 22. However, according to other embodiments of the present invention, the secondary relief surface angle vertex 94 may be found at a level different from the level of the insert tangential abutment surface 44. In that sense, the secondary relief surface angle vertex 94 may be found at a level that is higher or lower that the level of the insert tangential abutment surface 44.

The secondary relief surface 74 does not have to form a straight line as seen in a side cross-sectional view of the cutting insert 22. Rather, the secondary relief surface 74 may form a part of a non-cylindrical curved surface, in which case it will be a curved line in a side cross-sectional view of the cutting insert 22.

Figure 10:
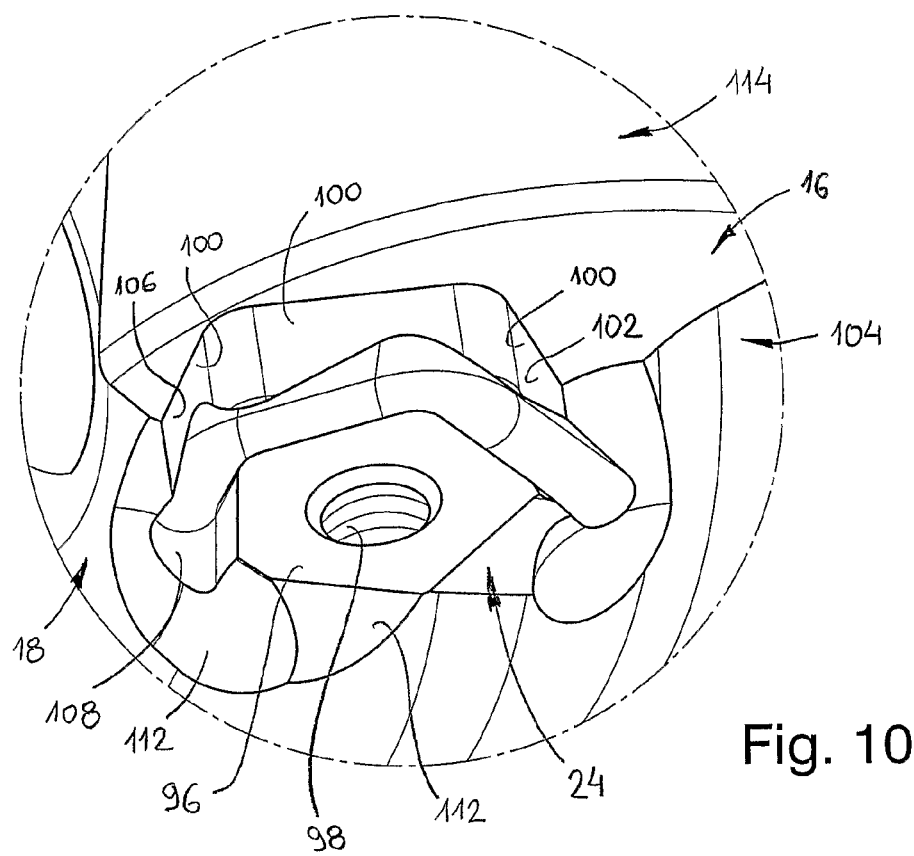
FIG. 10 is a perspective view of an insert pocket of the tool shown in FIG. 1.
Figure 11:
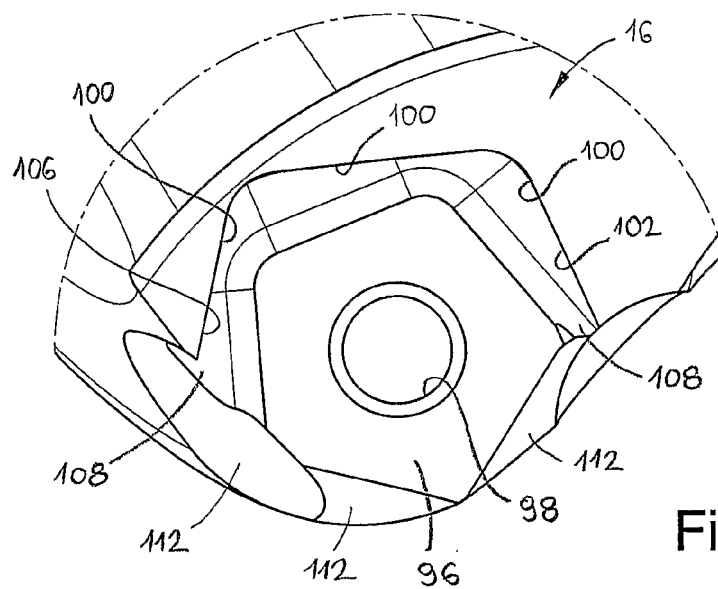
FIG. 11 is a top view of the pocket of FIG. 10.

Attention is now drawn to FIGS. 10 and 11. The insert pocket 24 comprises a pocket tangential abutment surface 96. A threaded bore 98 extends tangentially rearwardly from the pocket tangential abutment surface 96. Pocket side walls 100 extend upwardly from the pocket tangential abutment surface 96. Two of the pocket side walls 100 form pocket abutment surfaces, namely, a first pocket abutment surface 102 adjacent a periphery 104 of the tool body 16 and a second pocket abutment surface 106 adjacent the front end 18 of the tool body 16. Each of the first pocket abutment surface 102 and the second pocket abutment surface 106 forms a pocket internal angle θ with the pocket tangential abutment surface 96 and are separated by a pocket side wall 100 that is not a pocket abutment surface.

In order to provide the insert pocket 24 with the necessary clearances, the pocket tangential abutment surface 96 is separated from the pocket side walls 100 by a clearance groove 108. Similarly, a forward end 110 of the pocket tangential abutment surface 96 is provided with chamfered clearance surfaces 112.

Figure 12:
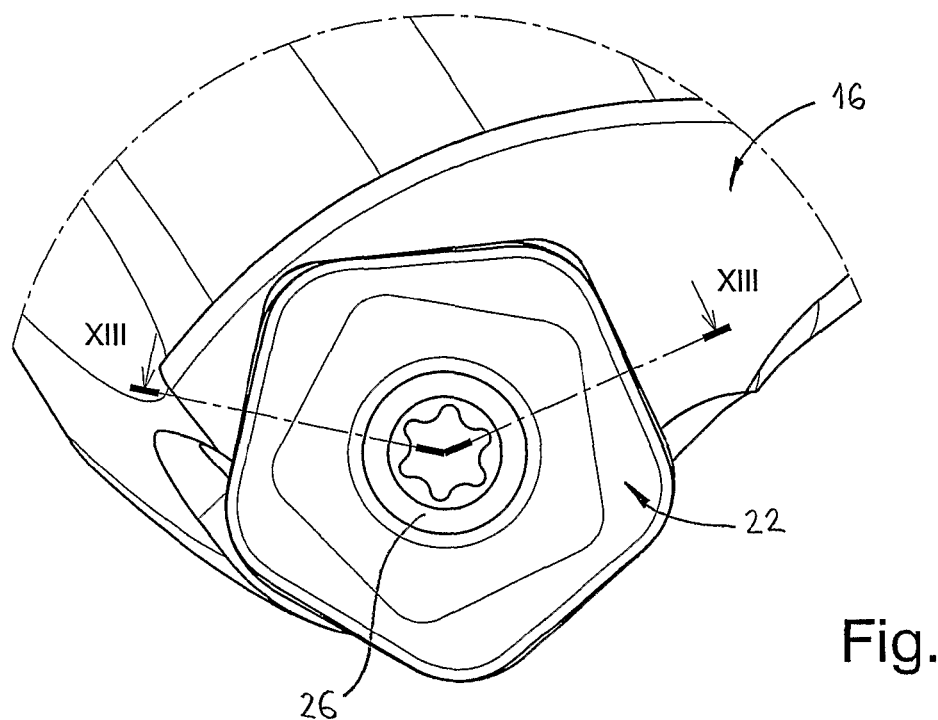
FIG. 12 is a top view of the cutting insert of FIG. 2 retained in the insert pocket of FIG. 10.
Figure 13:
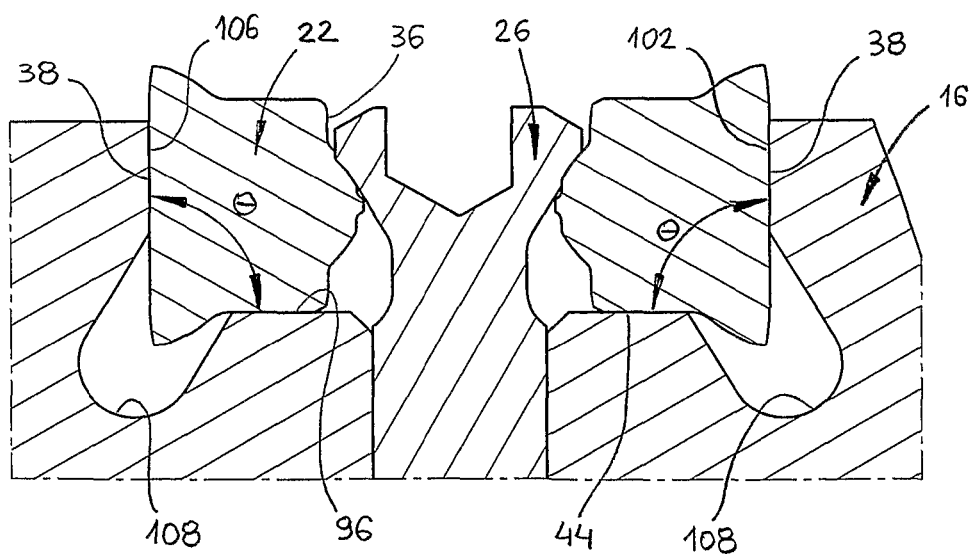
FIG. 13 is a cross-sectional view of the cutting insert and the insert pocket taken along line XIII-XIII in FIG. 12.

Attention is now drawn to FIGS. 12 and 13. When the cutting insert 22 is mounted within the insert pocket 24 the insert tangential abutment surface 44 abuts the pocket tangential abutment surface 96, a first side abutment surface 38 of the cutting insert 22 abuts the first pocket abutment surface 102, a second side abutment surface 38 of the cutting insert 22 abuts the second pocket abutment surface 106, and a clamping bolt 26 passes through the through bore 36 of the cutting insert 22 and threadingly engages the threaded bore 98 of the insert pocket 24. In that position, the side abutment surface 38 of the cutting insert 22 that is located between the two abutted first and second side abutment surfaces 38 remains unabutted.

The design of the cutting insert 22 as described above encounters several advantages. The construction of the primary cutting edge 50 is such that the chips produced are curled away from the longitudinal axis of rotation A of the cutting tool 10. Thus, beside improved chip evacuation capabilities, the flutes 114 of the tool body 16 may be accordingly decreased, thus increasing the strength of the tool body 16.

Figure 14:
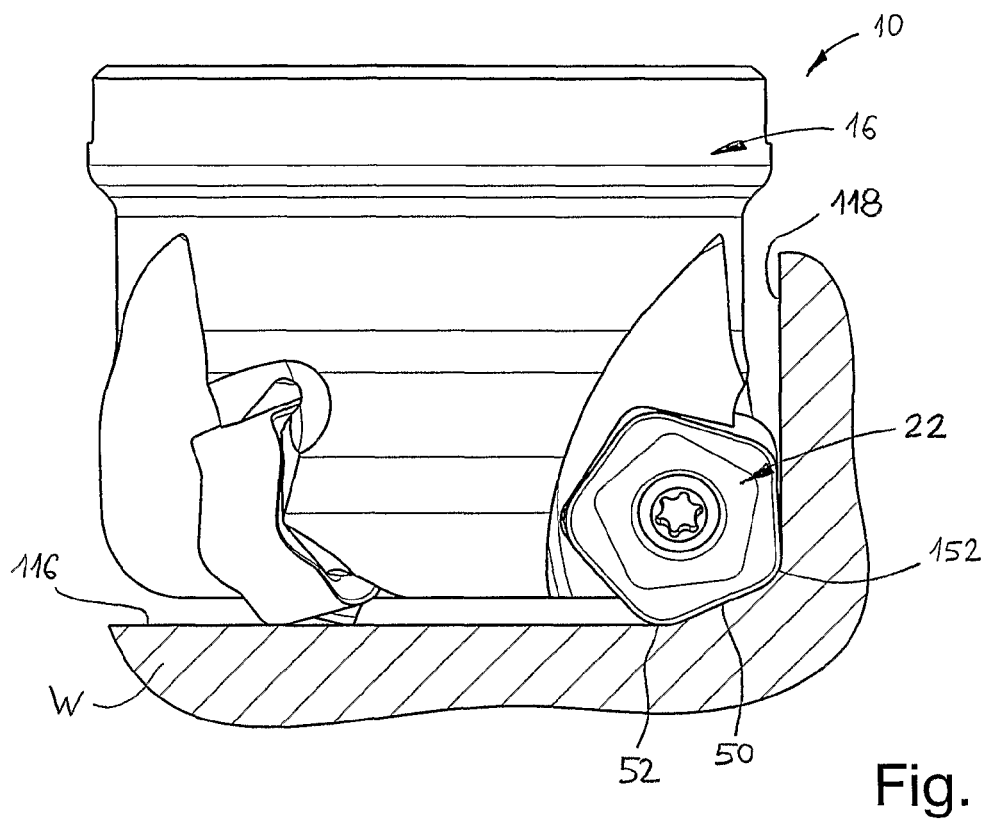
FIG. 14 is a side view of the cutting tool of FIG. 1 showing a top view of the cutting insert of FIG. 2 during machining.

The cutting tool 10 according to the present invention is advantageously used for performing face milling, at high feed, combined with ramp down operations. Furthermore, the cutting tool 10 may be also used to machine a shoulder. In that case, as shown in FIG. 14, the face milling of the machined face 116 of a workpiece W is carried out by the active cutting region 46, namely, by the primary cutting edge 50 and the secondary cutting edge 52. At the same time, the side milling, i.e., the milling of the shoulder 118, is carried out by the secondary cutting edge that is upwardly located with respect to the face 116 of the workpiece W. For the sake of illustration, the secondary cutting edge that is machining the shoulder 118 is numbered 152 in the drawing.

Figure 15:
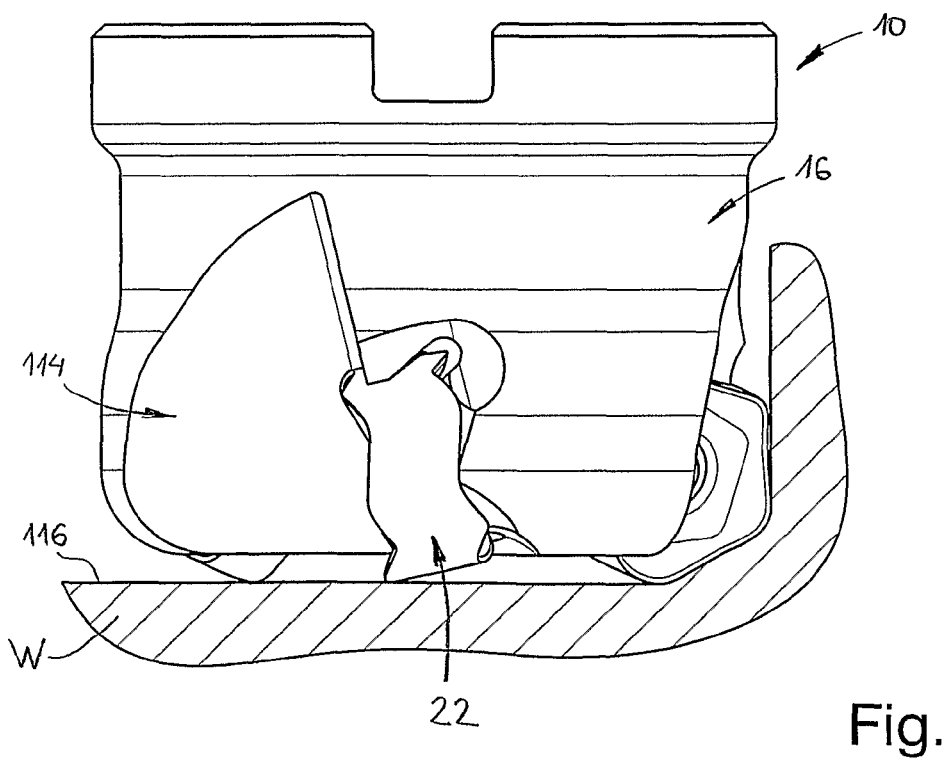
FIG. 15 is a side view of the cutting tool of FIG. 1 showing a side view of the cutting insert of FIG. 2 during machining.

FIG. 15 shows the negative axial orientation of the cutting insert 22 with respect to a workpiece W. In that orientation,

The invention claimed is:

1. A cutting insert (22) having a polygonal prismatic shape with two opposing end surfaces (28) and a peripheral surface (34) extending therebetween, a median plane (M) is located between the end surfaces bisecting the cutting insert, the peripheral surface has a plurality of polygonal sides (48), each polygonal side has a side abutment surface (38) and merges with an adjacent polygonal side through a rounded corner (40), each rounded corner forms a vertex (42) of the polygonal shape, the cutting insert comprising:
- a through bore (36), having a through bore axis (B), extending between the end surfaces;
- an insert tangential abutment surface (44) extending around the through bore;
- a cutting region (46) associated with each of the polygonal sides (48), the cutting region being elevated with respect to the insert tangential abutment surface (44) and comprising:
- a primary cutting edge (50), associated with a polygonal side (48), formed at an intersection of a primary rake surface (54) and a primary relief surface (56);
- a secondary cutting edge (52), associated with a rounded corner (40), formed at an intersection of a secondary rake surface (72) and a secondary relief surface (74), and merging with the primary cutting edge (50); wherein
- the primary cutting edge (50) comprises three primary cutting edge portions as seen in a side view of the cutting insert:
- a substantially straight first primary central portion (62) that is slanted with respect to the median plane;
- a convex second primary portion (64) that merges with the first primary central portion (62) at an upper end (66) of the first primary central portion; a concave third primary portion (68) that merges with the first primary central portion (62) at a lower end (70) of the first primary central portion;
- the secondary cutting edge (52) comprises three secondary cutting edge portions as seen in a side view of the cutting insert:
- a substantially straight first secondary central portion (82) that is slanted with respect to the median plane, the first primary and secondary central portions slanting in different directions;
- a convex second secondary portion (84) that merges with the first secondary central portion (82) at an upper end (86) of the first secondary central portion;
- a concave third secondary portion (88) that merges with the first secondary central portion (82) at a lower end (90) of the first secondary central portion;
- the primary relief surface (56) forms a primary relief surface angle (γ) with an associated side abutment surface (38), the primary relief surface angle varies from a primary first maximal value adjacent a primary edge upper end (58) to a primary second minimal value adjacent a primary edge lower end (60); and
- the secondary relief surface (74) forms a secondary relief surface angle (δ) with an associated rounded corner (40), the secondary relief surface angle varies from a secondary first maximal value adjacent a secondary edge upper end (76) to a secondary second minimal value adjacent a secondary edge lower end (78).

2. The cutting insert (22) according to claim 1, wherein the primary first maximal value is 10°.

3. The cutting insert (22) according to claim 1, wherein the primary second minimal value is 0°.

4. The cutting insert (22) according to claim 1 wherein the secondary first maximal value is 10°.

5. The cutting insert (22) according to claim 1, wherein the secondary second minimal value is 0°.

6. The cutting insert (22) according to claim 1, wherein the polygonal shape is a regular polygon.

7. The cutting insert (22) according to claim 6, wherein the regular polygon is a regular pentagon.

8. The cutting insert (22) according to claim 1, wherein the two end surfaces (28) are identical.

9. The cutting insert (22) according to claim 1, wherein the cutting insert has 180° rotational symmetry with respect to a symmetry axis (S) that extends between a vertex (42) and a through bore axis (B), and lies in the median plane (M).

10. The cutting insert (22) according to claim 1, wherein the primary relief surface (56) and the secondary relief surface (70) form straight lines in side cross-sectional views of the cutting insert.

11. The cutting insert (22) according to claim 1, wherein the primary relief surface (56) and the secondary relief surface (74) form curved lines in side cross-sectional views of the cutting insert.

12. A cutting tool (10) having a longitudinal axis of rotation (A) and comprising:
- a tool body (16) having at least one insert pocket (24) formed in a front end (18) of the tool body and a cutting insert (22) retained in the at least one insert pocket, the at least one insert pocket comprising:
- a pocket tangential abutment surface (96);
- a threaded bore (98) extending tangentially rearwardly from the pocket tangential abutment surface;
- pocket side walls (100) extending upwardly from the pocket tangential abutment surface, two of the pocket side walls are a first pocket abutment surface (102) and a second pocket abutment surface (106), each of which forms a pocket internal angle (θ) with the pocket tangential abutment surface;
- the cutting insert (22) has a polygonal prismatic shape with two opposing end surfaces (28) and a peripheral surface (34) extending therebetween, a median plane (M) is located between the end surfaces bisecting the cutting insert, the peripheral surface has a plurality of polygonal sides (48), each polygonal side has a side abutment surface (38) and merges with an adjacent polygonal side through a rounded corner (40), each rounded corner forms a vertex (42) of the polygonal shape, the cutting insert comprising:
- a through bore (36) extending between the end surfaces;
- an insert tangential abutment surface (44) extending around the through bore; a cutting region (46) associated with each of the polygonal sides (48), the cutting region being elevated with respect to the insert tangential abutment surface (44) and comprising:
- a primary cutting edge (50), associated with a polygonal side (48), formed at an intersection of a primary rake surface (54) and a primary relief surface (56);
- a secondary cutting edge (52), associated with a rounded corner (40), formed at an intersection of a secondary rake surface (72) and a secondary relief surface (74), and merging with the primary cutting edge (50);

the primary cutting edge (50) comprises three primary cutting edge portions as seen in a side view of the cutting insert:
- a substantially straight first primary central portion (62) that is slanted with respect to the median plane;
- a convex second primary portion (64) that merges with the first primary central portion (62) at an upper end (66) of the first primary central portion;
- a concave third primary portion (68) that merges with the first primary central portion (62) at a lower end (70) of the first primary central portion;

the secondary cutting edge (52) comprises three secondary cutting edge portions as seen in a side view of the cutting insert:
- a substantially straight first secondary central portion (82) that is slanted with respect to the median plane, the first primary and secondary central portions slanting in different directions;
- a convex second secondary portion (84) that merges with the first secondary central portion (82) at an upper end (86) of the first secondary central portion;
- a concave third secondary portion (88) that merges with the first secondary central portion (82) at a lower end (90) of the first secondary central portion;

the primary relief surface (56) forms a primary relief surface angle ($\gamma$) with an associated side abutment surface (38), the primary relief surface angle varies from a primary first maximal value adjacent a primary edge upper end (58) to a primary second minimal value adjacent a primary edge lower end (60);

the secondary relief surface (74) forms a secondary relief surface angle ($\delta$) with an associated rounded corner (40), the secondary relief surface angle varies from a secondary first maximal value adjacent a secondary edge upper end (76) to a secondary second minimal value adjacent a secondary edge lower end (78); wherein the insert tangential abutment surface (44) abuts the pocket tangential abutment surface (96), a first side abutment surface (38) of the cutting insert abuts the first pocket abutment surface (102), a second side abutment surface (38) of the cutting insert abuts the second pocket abutment surface (106), and a clamping bolt (26) passes through the through bore (36) of the cutting insert and threadingly engages the threaded bore (98).

13. The cutting tool (10) according to claim 12, wherein the first pocket abutment surface (102) and the second pocket abutment surface (106) are separated by a pocket side wall (100) that is not a pocket abutment surface and the side abutment surface (38) of the cutting insert that is located between the two abutted side abutment surfaces (38) remains unabutted.

14. The cutting tool (10) according to claim 12, wherein the pocket tangential abutment surface (96) is separated from the pocket side walls (100) by a clearance groove (108).

15. The cutting tool (10) according to claim 12, wherein a forward end (110) of the pocket tangential abutment surface (96) is provided with chamfered clearance surfaces (112).

16. A reversible, generally pentagonal-shaped cutting insert (22) comprising:
- two opposing end surfaces (28);
- a through bore (36) having a through bore axis (B) extending between the end surfaces;
- an insert tangential abutment surface (44) extending around the through bore on both end surfaces;
- an imaginary median plane (M) located between the end surfaces and bisecting the cutting insert;
- a peripheral surface (34) extending between the end surfaces and having five sides (48), each side having a side abutment surface (38) and merging with an adjacent side through a rounded corner (40); and
- a cutting region (46) associated with each side (48), each cutting region being elevated with respect to the insert tangential abutment surface (44) and comprising:
  - a primary cutting edge (50) associated with a side (48), formed at an intersection of a primary rake surface (54) and a primary relief surface (56), and extending towards the median plane (M) from a primary edge upper end (58) to a primary edge lower end (60); and
  - a secondary cutting edge (52) associated with a rounded corner (40), formed at an intersection of a secondary rake surface (72) and a secondary relief surface (74), and extending towards the median plane from a secondary edge upper end (76) to a secondary edge lower end (78);

wherein:
the secondary edge upper end (76) merges with the primary edge upper end (58);
a secondary edge lower end (78) merges with the primary edge lower end (60) of the primary cutting edge (50) of a preceding cutting region (46);
each rounded corner (40) forms a vertex (42) of the generally pentagonal shape;
the secondary edge lower end (78) and the primary edge lower end (60) are spaced apart from a corresponding associated vertex (42);
the primary relief surface (56) forms a primary relief surface angle ($\gamma$) with an associated side abutment surface (38), the primary relief surface angle ($\gamma$) varying from a primary first maximal value adjacent the primary edge upper end (58) to a primary second minimal value adjacent the primary edge lower end (60); and
the secondary relief surface (74) forms a secondary relief surface angle ($\delta$) with an associated rounded corner (40), the secondary relief surface angle ($\delta$) varying from a secondary first maximal value adjacent the secondary edge upper end (76) to a secondary second minimal value adjacent the secondary edge lower end (78).

17. The reversible, generally pentagonal-shaped cutting insert according to claim 16, wherein, in a side view of the cutting insert:
the primary cutting edge comprises three primary cutting edge portions including:
- a substantially straight first primary central portion (62) that is slanted with respect to the median plane;
- a convex second primary portion (64) that merges with the first primary central portion (62) at an upper end (66) of the first primary central portion; and
- a concave third primary portion (68) that merges with the first primary central portion (62) at a lower end (70) of the first primary central portion; and the secondary cutting edge comprises three secondary cutting edge portions including:
- a substantially straight first secondary central portion (82) that is slanted with respect to the median plane, the first primary and secondary central portions slanting in different directions;
- a convex second secondary portion (84) that merges with the first secondary central portion (82) at an upper end (86) of the first secondary central portion; and
- a concave third secondary portion (88) that merges with the first secondary central portion (82) at a lower end (90) of the first secondary central portion.

* * * * *